Patented Mar. 26, 1940

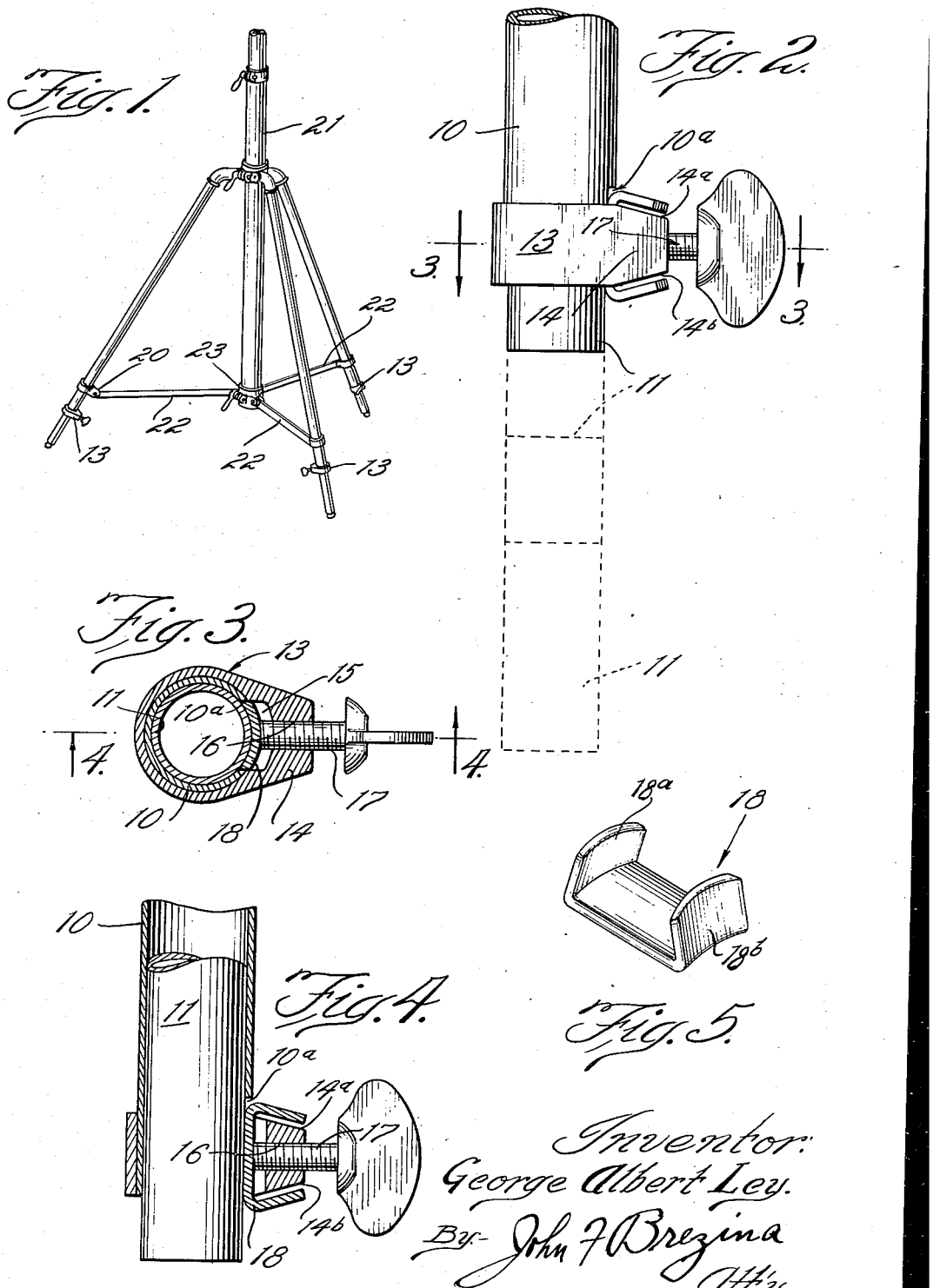

2,194,800

UNITED STATES PATENT OFFICE 2,194,800

ADJUSTABLE CLAMP

George Albert Ley, Chicago, Ill.

Application October 4, 1937, Serial No. 167,136

3 Claims. (Cl. 24—243)

This invention relates to a clamping device or adjustable clamp adapted for use in connection with extensible or telescopic legs or other adjustable members such as used on portable tripods and other apparatus, for example clamps for the support of cameras, surveying instruments, telescopes, and the like.

An important object of my invention is the provision of an adjustable clamp adapted to be removably or permanently mounted upon the outer hollow member, such as a tube of a telescopic leg, arm or other supporting or bracing element, the said adjustable clamp comprising an annular body terminating in a suitably threaded integral shank in combination with a substantially U-shaped friction block adjustably and movably mounted with respect to said clamp as to be moved in a radial direction and to normally engage the surface of the inner member of the telescopic element to hold the same in any desired position.

A further object of my invention is the provision of an adjustable clamp for tubular telescopic members used in connection with portable apparatus, of annular circumferential cross section and having an integral shank, boss or head provided with a screw threaded passageway and thumb screw, in combination with a substantially U-shaped friction block mounted for movement in a radial direction with respect to the axis of the said clamp and adapted to frictionally engage the inner of a pair of telescopic elements.

A further object of the invention is the provision of an adjustable clamp for securing telescopic members in adapted and desired positions, which clamp defines substantially a circle and having an inwardly opening recess therein, a bevelled integral shank portion and a substantially U-shaped friction block or plate movably mounted on said boss or shank portion so as not to fall off and become lost in normal use and when the clamp is partly or wholly removed from the telescopic member.

Other and further objects of my invention will be apparent from the following specification and claims.

This invention (in preferred form) is illustrated and described in the following specification and accompanying drawing.

On the drawing:

Fig. 1 is a perspective view of a tripod forming an adjustable and portable support for a camera or the like, each of the three legs of the tripod being telescopic and illustrating the point of my invention. Fig. 2 is an enlarged side elevational view of my adjustable clamp mounted on the end of the outer of a pair of telescopic members adapted to form legs or other similar supporting means.

Fig. 3 is a cross sectional view taken on line 3—3 of Fig. 2.

Fig. 4 is a vertical and cross sectional view of my invention taken on line 4—4 of Fig. 3.

Fig. 5 is an enlarged perspective view of the novel clamping block or plate forming a part of my invention.

As shown in Figs. 1, 2, 3, and 4 the outer telescopic tube and tubular member forms one section each of an adjustable leg, and the outer and free end of each thereof has a recess 10a cut from said end, as shown in Figs. 2 and 4. Numeral 11 indicates the inner extensible telescopic tube or member which is extensible and projectable to the desired degree and forming the adjustable section of the leg for a support for easels, stands, or other portable supporting apparatus for cameras, surveying instruments and the like. As is well known the inner telescopic tube 11 slides rather loosely within tube member 10 and the adjustable clamping means provided and herewith described is adapted to hold the same in desired relative positions.

In the illustration of the drawing, numeral 21 illustrates the central standard, which may or may not be telescopic and the upper ends of the outer tubular members or leg portions 10 are each provided with a suitable hinge joint 20 whereby said extensible and adjustable legs may be either extended outwardly to extreme position or folded in substantially parallel compact position in substantial alignment with the central standard 21 when the device is being transported.

The extensible clamp of my invention comprises principally of an annular ring-like body 13 which has a thicker shank, head or boss 14 formed integral therewith, said shank or boss projecting outwardly from the ring portion and provided with an inwardly opening recess 15 which extends from one end of the clamp to the other end. The opposite end surfaces of the shank 14 are bevelled as indicated at 14a and 14b and converge toward each other so that the end of the boss is substantially smaller than the portion thereof which merges with the annular body of the clamp. Said boss is provided with a radially extending threaded aperture or passageway 16 into which is threaded the correspondingly threaded portion of thumb screw 17.

Numeral 18 designates a friction block, plate or member of substantially channel-shaped cross section, the opposite ends 18a and 18b whereof are bent at an acute angle to the intermediate portion thereof. Friction plate 18 is preferably, though not necessarily, curving its intermediate portion to present a concave surface which is adapted to frictionally engage the inner of a pair of telescopic members. The distance between the opposite ends 18a and 18b is slightly greater than the thickness of the shank or boss in order that the said friction member may be movable in a radial direction and to and against the tubular section forming part of the telescopic supporting means, and at the same time it is of such dimensions that the friction member cannot fall off and become lost as the losing of same would be a very objectional feature and would render the clamp undesirable and uncommercial.

As shown in Figs. 2 and 4, the friction member 18 is movable throughout the recess 10a of tube 10 so that when moved in either direction, it moves through said recess, and when the wing nut 17 is manually rotated to clamp the telescopic tubes in desired relative position, the concave surface of the intermediate portion of friction member 18 presses against and frictionally and rigidly engages the surface of the inner tube 11. In the preferred form illustrated in the drawing, the adjustable clamp of my invention is securely mounted on the lower end of the outer telescopic tube 10 and in a position so that the friction plate or member 18 overlies the recess 10a. Securing the clamp as stated prevents its falling off in use and insures its being in proper position when it is needed.

It is to be noted that the inwardly opening recess 15 is of sufficient depth so that the intermediate curved portion of the friction member 18 will be freely movable to be moved away from any frictional engagement with the inner telescopic tube 11. It is also to be understood that the clamp 13 need not be secured to the outer telescopic member but may be merely slidable thereon and susceptible of placement in any desired location where suitable openings are provided to permit the friction member 18 to press against and engage the inner telescopic tube 11.

Fig. 1 illustrates a typical adaptation of extensible telescopic legs in connection with an extensible and telescopic standard such as used in connection with portable collapsible camera supports. Numeral 22 designates connecting levers which have their outer ends hinged to a suitable clamp on the outer telescopic tubes 10 respectively and which have their rear ends hingedly mounted upon a slidable collar 23 which is adapted to slide upwardly when the legs are folded to innermost position. Numerous other adaptations and uses of the aforedescribed clamp other than that illustrated may be found with similar advantages.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In an adjustable clamp for interfitting telescopic supporting members, an annular metal body terminating in an integral projecting shank, said shank being provided with a radially extending threaded passageway and having an inwardly opening recess extending in a direction parallel to the main aperture of the clamp, a thumb screw threadingly engaging said threaded passageway the outer end surfaces of the shank being bevelled and converging outwardly toward each other; and a friction member having angularly formed ends and movably mounted adjacent the inner surface of said shank and having its said angular ends converging toward each other on opposite sides of the side surfaces of said shank and to form an angle of less than 90 degrees, said flanges being adapted to prevent said friction member from falling off of said shank.

2. In an adjustable clamp for interfitting telescopic tubular members, an annular ring-like body terminating in an integral boss having opposite bevelled end surfaces converging toward each other, said boss having a radially extending threaded aperture therein the inner portion of said shank being longitudinally recessed; a movable friction element of channel-like cross section mounted for movement in said recesses of said shank, the opposite ends of which converge toward each other and which releasably engage the opposite bevelled ends respectively of said boss to prevent said friction element from falling off in normal use; and a thumb screw threaded in said aperture in said boss adapted, when rotated, to bear against said friction element to cause the same to engage the inner of a pair of telescopic sections.

3. In an adjustable clamping device of the class described adapted for use to secure a pair of extensible interfitting members together, a clamp comprising an annular body having an enlarged integral portion provided with a threaded aperture and having an inwardly opening recess along the inner surface of said body and underlying said threaded aperture; a substantially U-shaped friction plate loosely mounted on said body and across said recess, said friction plate having the ends thereof hooked over a portion of said clamp body to prevent dropping of the same; and screw means threaded in said aperture and adapted to press said friction plate against the inner of a pair of interfitting members.

GEORGE ALBERT LEY.